Patented Jan. 6, 1953

2,624,725

UNITED STATES PATENT OFFICE 2,624,725

NONELECTROSTATIC SYNTHETIC RESIN MATERIAL

Johan A. Bjorksten, Madison, and John B. Eisen, Waterloo, Wis., assignors to Monsanto Chemical Company, St. Louis, Mo., a corporation of Delaware No Drawing. Application January 4, 1950, Serial No. 136,841

7 Claims. (Cl. 260—93.5)

This invention relates to synthetic resin molding materials, and more specifically to such molding materials which are substantially non-susceptible to the accumulation of electrostatic charges and to a method for eliminating the highly undesirable effects of electrostatic charges which build up on synthetic resin articles, more particularly articles comprising synthetic resins such as polyvinyl chloride, polystyrene or copolymers of either which are particularly susceptible to acquiring electrostatic charges.

Fibers, film sheets and other articles made of such polymers have been particularly subject to the objectionable characteristics resulting from high electrostatic susceptibility. As a result of such susceptibility, these articles accumulate electrostatic charges which attract dust, lint, tobacco ashes, and like materials and cause such particles to cling tenaciously to the articles. In the case of fibers, for example, a fiber composed of a synthetic resin having a high electrostatic susceptibility clings to guides and rolls of textile machinery and is damaged or seriously weakened by such machinery if not satisfactorily treated to eliminate electrostatic charges.

Prior to this time, no method for eliminating these defects has been described which will remain effective over an indefinite period of time, or which constitutes more than an essentially temporary treatment, or which is independent of the ambient humidity. The methods of the prior art depend on the property of directly wetting the synthetic resin articles with an aqueous material or upon the property of deliquescence to cause the article to be so wetted. Such materials include glycols, glycerine, sorbitol, sulfonates, and the materials disclosed in U. S. Patent 2,403,960. These treatments produce only a temporary absence of electrostatic charge; the length of time during which the treatment remains effective being dependent on the ambient humidity. In dry climates the duration is very short. The effectiveness of such treatments may be renewed by wiping with a wet cloth or otherwise wetting the article but such re-treatment remains effective only until the water evaporates. For example, an article which has been treated by such a method, and then allowed to remain in a paper container such as an envelope, until dry, acquires an electrostatic charge from friction with the paper upon merely being removed from such a container.

This invention, on the other hand, provides substantially permanent freedom from the disadvantages of electrostatic charges. This invention does not in any way depend on wetting the molded article with aqueous or deliquescent substances and therefore produces results substantially independent of humidity. A further advantage of this invention over the prior art is that it makes possible the production of electrostatically non-susceptible articles directly by the molding in a single operation instead of being restricted to methods of subsequent treatment.

An object of this invention is therefore to provide a method for eliminating the effects of electrostatic charges on synthetic resin articles.

Another object is to provide articles comprising synthetic resins which are free of the effects of electrostatic charges.

Another object is to provide a method of substantially permanently making synthetic resin articles free from the effects of electrostatic charges.

Another object is a plastic material in which the tendency to build up static surface charges is largely reduced and even completely eliminated.

Another object is a new plastic composition.

Another object is novel means to reduce the static charges in objects made by injection molding processes.

Further objects and advantages of this invention will become apparent as the following detailed description proceeds.

In accordance with this invention, a molding powder which may comprise any resinous polymer susceptible to accumulation of an electrostatic charge is incorporated with from 0.03 to 1.0 percent of a primary, secondary or tertiary aliphatic amine with at least 6 carbon atoms in at least one of the radicals attached to the nitrogen atom, and 0.005 to 0.5 percent of a compound selected from the group consisting of phosphoric, sulfuric and sulfamic acids.

The incorporation may be accomplished by any of the methods known to the prior art, such as by adding the amine and the acid to the powder either directly or in solution and by mixing, for example by either stirring, tumbling or by co-extruding and subsequently grinding the ingredients. Articles made from such molding powders are found to accumulate substantially no electrostatic charges even after vigorous rubbing with woolen or cotton cloth.

The invention is further illustrated by the following specific examples, which are given by way of illustration only and not in any sense are to be construed by way of limitations. All parts and percentages shown in the examples are by weight.

Example I

Polystyrene granules having an average molecular weight of 20,000 and an average diameter of a quarter inch were tumbled with a mixture of 0.08 percent of cyclohexyldiethyl amine, 0.02 percent of sulfamic acid and 0.5 percent of polyethylene glycol ether having an average molecular weight of 400. The resulting material was extruded to mix the components thoroughly and was then molded in an injection molding machine at 325° F. The articles thus produced were tested and were proved to be substantially free from electrostatic charge for a period of 3 months, as expressed by lack of attraction for fine particles of dust, pulverized cigarette ashes and other similar non-conducting particles.

Example II

To 99.81 parts of polystyrene molding powder were added 0.15 part stearyldimethyl amine and 0.04 part of orthophosphoric acid. These ingredients were thoroughly incorporated by mixing the materials and then passing them through an extruder to secure intimate mixture. The resulting composition was injection molded at 360° F. with a mold temperature of 180° F. The resultant moldings were determined to have substantially no electrostatic charge, as measured with an electronic voltmeter, monthly, over a period of 3 months.

Example III

To 98.97 parts of polystyrene molding powder were added 0.25 parts of lauryldiisopropyl amine, 0.03 part of sulfuric acid and 0.75 part of polyethylene glycol ether having an average molecular weight of 400. The ingredients were mixed as in Example I. The resultant product was comminuted and was then molded in a compression molding press at 210° F. The article thus molded was tested monthly for electrostatic charge over a period of 3 months, and was found to be nonstatic throughout this time.

Example IV

To 99.44 parts of polystyrene molding powder were added 0.5 part of dilaurylmethyl amine and 0.06 part of pyrophosphoric acid. The mixture was thoroughly intermingled by tumbling and extruding and was then molded into small articles in an injection molding machine. The resultant articles were found to be substantially free from electrostatic charge after being rubbed vigorously with a wool cloth, at monthly intervals over a period of 3 months.

Example V

Polystyrene granules having an average molecular weight of 20,000 and an average diameter of a quarter inch were tumbled with a mixture of 0.2 percent of decahydronaphthyldimethyl amine, 0.03 percent of sulfamic acid and 0.5 percent of polyethylene glycol ether having an average molecular weight of 400. The resulting material was extruded to mix the components thoroughly and was then molded in an injection molding machine at 250° F. with a mold temperature of 100° F. The articles thus produced were tested to determine their susceptibility to becoming electrostatically charged by rubbing vigorously with a wool cloth and then observing the amount of attractive force exerted on lint, dust and pulverized cigarette ashes. No effects of the presence of an electrostatic charge could be observed. The effectiveness of the treatment was unimpaired after 3 months.

Example VI

To 99.73 parts of molding powder comprising a copolymer of 88 percent vinyl chloride and 12 percent vinyl acetate were added 0.2 part of dioctyl amine and 0.07 part of sulfuric acid. The mixture was thoroughly intermingled by tumbling and extruding and was then molded into small blocks in an injection molding machine. The resultant articles were found to have substantially no electrostatic charge after being rubbed vigorously with a wool cloth. Testing was continued at intervals and the absence of any electrostatic charge confirmed through a 3-month period.

Example VII

To 99.65 parts of polymethylmethacrylate molding powder were added 0.3 part of stearyl amine and 0.05 part of sulfamic acid. The mixture was thoroughly intermingled by tumbling and extruding and was then molded into small articles in an injection molding machine. The resultant articles were found to be substantially free from electrostatic charge after being rubbed vigorously with a wool cloth. Testing was continued at monthly intervals and the absence of any electrostatic charge confirmed throughout a 3-month period.

Example VIII

To 99.94 parts of polyethylene molding powder were added 0.05 part of nonyl amine and 0.01 part of sulfuric acid. The mixture was thoroughly intermingled by tumbling and extruding and was then molded into small articles in an injection molding machine. The resultant articles were found to have substantially no electrostatic charge after being rubbed vigorously with a wool cloth. Testing was continued at monthly intervals and the absence of any electrostatic charge confirmed throughout a 3-month period.

The above examples by no means exhaust the different possible applications of the invention. They have been shown by way of illustration only and not in any sense by way of limitation.

It is to be understood that the invention is capable of considerable variation without deviation from its major aspects. Although the examples have shown the use of a number of aliphatic amines as being operative in this invention, other primary, secondary and tertiary aliphatic amines can be used which have at least 6 carbon atoms in at least one of the radicals attached to the nitrogen atom; and although only the use of sulfuric, sulfamic and phosphoric acids have been shown in the examples, other agents may be useful for performing the same function, strong mineral acids being generally of the greatest utility. While in the phosphoric group, orthophosphoric acid is preferred, the other phosphoric acids may also be used.

The examples have shown application of this invention to polystyrene, copolymers of vinyl chloride and vinyl acetate, polymethylmethacrylate and polyethylene. It should be clearly understood that this is illustrative and not limiting in any way as the invention is applicable to all resinous polymers capable of acquiring an electrostatic charge, such as, for example, polyamides, polyfluoroethylene, polyacrylonitrile, halogenated polystyrenes, polydivinylbenzenes, polystilbenes, polybutenes and rubber and copolymers of these chemical groups.

The methods and conditions for carrying out the injection molding of the composition of this invention is not a subject of the invention and may be those of any molding procedure. Temperatures and cycle times given in the examples are purely illustrative. For example, polystyrene with amines and acids, to which this invention relates, incorporated therein may be molded at temperatures of 200° F. to 400° F. in a compression molding machine or in an injection molding machine with a mold temperature of 75° F. to 310° F.

While this invention does not generally favor the addition of other agents, and these are not essential to the invention, yet for some purposes the following may be included in the composition: additional plasticizers, mold release agents and excipients or various types of surface active agents, pigments, dyes and the like. While certain specific concentrations of anti-electrostatic material have been employed, it is to be understood that this invention may employ the amine in question in concentrations of from 0.03 percent to 5.0 percent and the acid in concentrations of from 0.005 to 0.5 percent although for best results we prefer to employ at least about 0.04 percent of the amine and 0.01 percent of the acid and at most 1.5 percent of amine and 0.15 percent acid.

While we do not wish to commit ourselves to any specific theory regarding the manner of function of the invention, we believe that it depends for its efficacy on two agents: an electroisomeric agent and an acid component, the amine being the electroisomeric substance. In the case of this agent, we believe that variation in the nitrogen atom may lead to an electron transfer about or along the surface on which the agent in question has been absorbed. The acid component, on the other hand, we believe to be an incompatibility factor, which prevents the electroisomeric ingredient from becoming so thoroughly incorporated with the synthetic resin as to be inaccessible on the surface thereof. Accordingly, by balancing the electroisomeric ingredient and the compatibility-limiting ingredient in such a fashion that the electroisomeric ingredient will not be fully taken up by the synthetic resin but will be at least to some extent on its surface in the process of molding, it is possible to secure the optimum benefit of the invention.

On the basis of this disclosure, it is believed that those skilled in the art will find it easy to so compound the ingredient within the ranges given, as to secure the maximum benefit of the invention in any given case.

While certain specific acids have been disclosed, it is to be understood that any other acid reactive with the primary, secondary or tertiary amine type electroisomeric agent in question, which will limit the compatibility of this agent with polystyrene or other synthetic resin, will be suitable for the purposes of this invention.

While specific reference has been made to polystyrene, it is understood that the invention may also be applied to other types of resins such as vinyl chloride, vinyl acetate, vinylidene chloride, acrylonitrile, hydrocarbon polymers and generally to any thermoplastic resin, which is characterized by a tendency to build up electrostatic charges.

It is thus apparent that the invention is broad in scope and is not to be restricted excepting by the claims in which it is our intention to claim all novelty inherent in the invention as broadly as possible in view of the prior art. Having thus disclosed our invention, we claim:

1. A composition of matter consisting essentially of: a thermoplastic synthetic resin, an aliphatic mono amine with at least 6 carbon atoms in at least one of the radicals attached to the nitrogen atom, and a compound selected from the group consisting of phosphoric, sulfuric and sulfamic acids.

2. A composition of matter consisting essentially of: polystyrene, an aliphatic mono amine with at least 6 carbon atoms in at least one of the radicals attached to the nitrogen atom, and a compound selected from the group consisting of phosphoric, sulfuric and sulfamic acids.

3. A composition of matter consisting essentially of: a moldable synthetic resin, 0.03 to 5.0 percent of an aliphatic mono amine with at least 6 carbon atoms in at least one of the radicals attached to the nitrogen atom, and 0.005 to 0.5 percent of a compound selected from the group consisting of phosphoric, sulfuric and sulfamic acids.

4. A composition of matter consisting essentially of: a moldable synthetic resin, 0.04 to 1.0 percent of an aliphatic mono amine with at least 6 carbon atoms in at least one of the radicals attached to the nitrogen atom, and 0.01 to 0.15 percent of a compound selected from the group consisting of phosphoric, sulfuric and sulfamic acids.

5. An article of manufacture consisting essentially of a thermoplastic synthetic resin containing from 0.03 to 5.0 percent of an aliphatic mono amine with at least 6 carbon atoms in at least one of the radicals attached to the nitrogen atom, and 0.005 to 0.5 percent of a compound selected from the group consisting of phosphoric, sulfuric and sulfamic acids.

6. An article of manufacture consisting essentially of a thermoplastic synthetic resin containing from 0.04 to 1.0 percent of stearyl dimethyl amine and from 0.01 to 0.15 percent of phosphoric acid.

7. An article of manufacture consisting essentially of a thermoplastic synthetic resin containing from 0.04 to 1.0 percent of stearyl dimethyl amine and from 0.01 to 0.15 percent of sulfamic acid.

JOHAN A. BJORKSTEN.
JOHN B. EISEN.

REFERENCES CITED

The following references are of record in the file of this patent:

UNITED STATES PATENTS

| Number | Name | Date |
|---|---|---|
| 2,216,020 | Nordlander | Sept. 24, 1940 |
| 2,322,240 | Kropa | June 22, 1943 |
| 2,332,895 | D'Alelio | Oct. 26, 1943 |
| 2,332,896 | D'Alelio | Oct. 26, 1943 |
| 2,403,960 | Stoops | July 16, 1946 |
| 2,491,443 | Cox | Dec. 13, 1949 |